Feb. 14, 1967 W. R. JOHNSON 3,304,370
REPRODUCING HEAD AND SYSTEM INCORPORATING LOW FREQUENCY EMPHASIS MEANS
Filed May 17, 1963
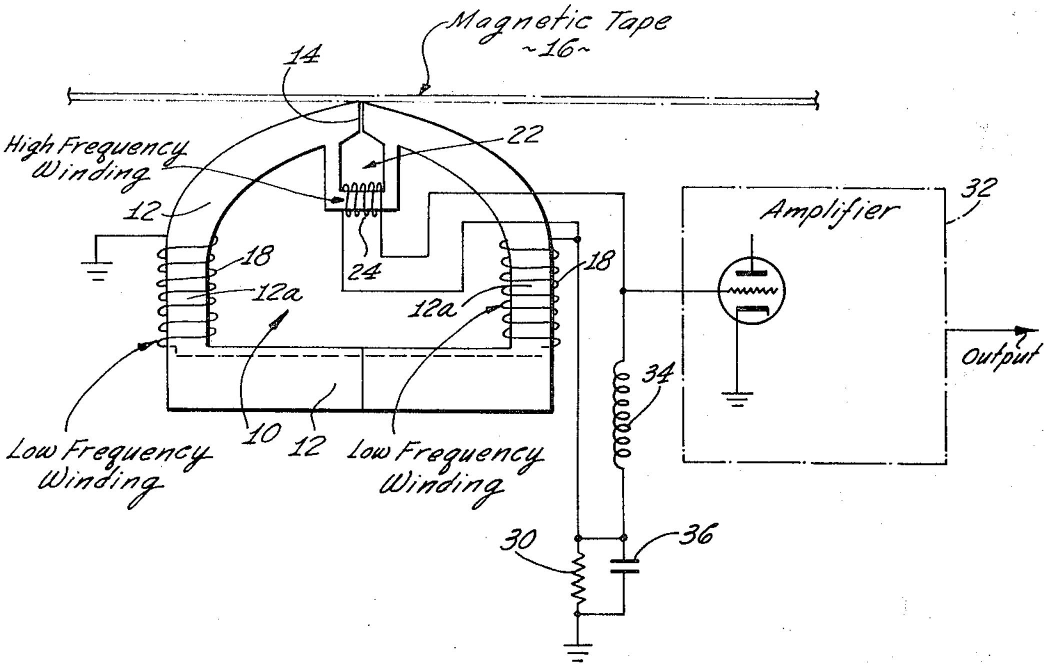
INVENTOR
Wayne R. Johnson
By Keith D. Beecher
Attorney

United States Patent Office 3,304,370

Patented Feb. 14, 1967

3,304,370

REPRODUCING HEAD AND SYSTEM INCORPORATING LOW FREQUENCY EMPHASIS MEANS

Wayne R. Johnson, Woodland Hills, Calif., assignor to Winston Research Corporation, Los Angeles, Calif., a corporation of California Filed May 17, 1963, Ser. No. 281,092

4 Claims. (Cl. 179—100.2)

The present invention relates to magnetic transducers; and it relates more particularly to improved magnetic reproducing heads, and associated networks, for use in magnetic tape recorders, and which are constructed to incorporate low frequency emphasis means so as to compensate for the drop in the low frequency response of the usual magnetic reproducing head and system.

As is well known, in most applications it is desirable in magnetic recording and reproduction to record and reproduce intelligence with high fidelity over a relatively wide frequency range. However, due to the characteristics of the usual magnetic reproduce head, the response at the low frequency end of the range has a tendency to drop off at a rapid rate. Moreover, attempts to improve the low frequency response by selective amplification in the associated electronic amplifier circuits is also limited by the inherent noise of the circuits, which noise increases as an inverse ratio with frequency.

The low frequency response of the prior art transducer head may be increased by increasing the number of turns on the head. However, such an increase in the number of turns affects its high frequency response due to the increased capacity of the winding which functions as an effective short circuit at the higher frequencies.

The response of the usual magnetic reproducing head is low at the relatively low signal frequencies due to its inherent characteristics, as is well known, and the response also drops off at the relatively high signal frequencies due to the aforesaid capacitive effects. The response of the prior art magnetic reproducing head, therefore, rises to a peak at an intermediate frequency between the low frequency and high frequency end of the range.

Therefore, in order to obtain the desired high fidelity reproduction of the magnetic recording/reproducing system, in which substantially uniform response is exhibited over the full range of signal frequencies to be reproduced by the system, the inherent response characteristic of the usual prior art reproducing head must be corrected at the low frequency end of the frequency range, and further compensation must be made for the drop in response at the high frequency end of the range.

Suitable compensation for the drop in response of the prior art magnetic reproducing head at the high frequency end of the frequency range can be effected by a pre-emphasis of the high frequency signals during the recording process. However, any attempt to pre-emphasize the lower signal frequencies usually results in saturation of the magnetic recording medium and thereby produces distortions in the system.

It is necessary, therefore, to compensate in the reproducing portion of the system for the drop in response at the lower signal frequencies. The resulting system in which pre-emphasis during recording is used to compensate for the drop in response at the high frequency end of the range, and in which compensation in the reproducing system for the drop in response at the low frequency end of the range, results in the reproduction of the signal with high fidelity throughout a relatively wide frequency range.

As noted above, it is inappropriate to provide the required low frequency boost in the electronic amplifier circuits included in the reproducing system. This is because the noise generated in the amplifiers is more and more prevalent at the lower signal frequencies.

Also, it is not appropriate to provide the desired low frequency compensation merely by increasing the number of turns of the magnetic reproducing head, this being because the increase in turns has an adverse capacitive shunting effect for the higher signal frequencies, thereby lowering the high frequency response of the reproducing system.

In the improved magnetic reproducing head of the present invention, the desired low frequency emphasis of the reproduced signal is provided prior to amplification. The reproducing head itself, as will be described, is constructed to include means for increasing the amplitude of the signals in the low frequency end of the frequency range without affecting the response of the system at the high frequency end of the range.

It is, accordingly, an object of the present invention to provide an improved electromagnetic reproducing head which is capable of responding to magnetically recorded signals on a magnetic tape, which signals extend through a relatively wide frequency range, and of producing corresponding electrical signals with an essentially uniform response throughout the range.

Another object of the invention is to provide such an improved electromagnetic reproducing head which is capable of reproducing such magnetically recorded signals with essentially uniform response and with sufficiently high signal-to-noise ratios so as to render the head suitable for the reproduction of wide range video signals.

Another object of the invention is to provide such an improved electromagnetic reproducing head which is relatively simple in its construction and which can be manufactured and sold at a relatively low cost.

Other objects and advantages of the invention will become apparent upon a consideration of the following specification, when the specification is taken in conjunction with the accompanying drawing, in which the single figure illustrates a magnetic reproducing head constructed in accordance with one embodiment of the invention, and also illustrates a suitable network for coupling the head to an appropriate amplifier circuit.

The magnetic reproduce head disclosed in the drawings is in actuality a composite integral structure incorporating a low frequency magnetic reproduce head and a high frequency magnetic reproduce head. The composite magnetic reproduce head is indicated generally as 10, and it includes a magnetic core 12 which may be of the usual laminated assembly, and which may be composed of usual magnetizable material, such as soft iron.

The head 10 includes a gap 14 in its upper surface, and a magnetic tape 16 is drawn across the gap. In accordance with usual magnetic recording/reproducing principles, the magnetically recorded signals on the tape 16 are sensed by the head 10 as the tape is drawn across the gap 14.

The core 12 has a first portion which forms the outer periphery of the composite head 10 and which has a relatively large outside dimension. The core defines a pair of legs 12*a*, and a corresponding pair of low frequency windings 18 are wound on these legs. The low frequency windings 18 may have, for example, 1000–10,000 turns, depending upon the size of the wire and on the area of the coil form (not shown) supporting the windings.

The core 12 also has an inner high frequency section 22 of a U-shaped configuration and having relatively small transverse dimensions, as compared with the transverse dimensions of the legs 12*a*. A high frequency winding 24 is wound about the section 22. This latter winding may, for example, have approximately 100 turns.

The low frequency windings 18 are connected in series, one terminal of the series connecting winding being connected to a point of reference potential, such as ground, and the other terminal being connected to a grounded resistor 30. The high frequency winding 24 has a first terminal which is connected directly to the input of an amplifier 32, and it has a second terminal which is connected, with the aforementioned terminal of the low frequency winding 18, to the grounded resistor 30.

An inductance coil 34 is connected across the winding 24. This inductance coil has a reactance which is appreciably higher than the reactance of the winding 24, so that it provides a minimum amount of electrical shunting to the winding 24 at the high frequency end of the range of signals reproduced by the head 10. At the low frequency end of the range, the inductance coil 34 effectively forms a short circuit across the high frequency winding 24. A capacitor 36 is shunted across the low frequency windings 18, and this capacitor effectively forms a short circuit across the low frequency windings at the higher signal frequencies.

It will be appreciated that during the operation of the magnetic reproducing head 10, the short circuiting effect of the capacitor 36 at the higher signal frequencies effectively increases the reluctance of the legs 12*a* of the core to magnetic fluxes at these frequencies by usual transformer action. Therefore, the high frequency magnetic flux is diverted into the high frequency section 22 of the core 12 of the reproduce head, so that the corresponding high frequency signals appear across the winding 24 for application to the amplifier 32.

Likewise, at the low frequency end of the frequency range, the electrical shunting effect of the inductance coil 34 increases the reluctance of the high frequency core section 22, so that the flux corresponding to the low frequency signals is diverted down to the legs 12*a*. Therefore, the low frequency signals are reproduced by the high-turn windings 18 to appear emphasized across the resistor 30.

Since the flux corresponding to the high frequency signals does not pass through the legs 18, the high frequency signals do not appear across the high turn windings 18, so that there is no tendency for the relatively high capacity of these latter windings to provide short circuits at the high frequency end of the range.

In the manner described above, the composite head illustrated in the drawing provides emphasis for the reproduced low frequency signals without affecting its response to the high frequency signals. Therefore, when normal pre-emphasis is used during the recording process for the high frequency signals, the head and coupling network of the drawing are capable of introducing signals to the amplifier 32 with low frequency emphasis. This means that the resulting output from the amplifier can be controlled to represent an essentially uniform response throughout a wide frequency range, and with vastly improved low frequency signal-to-noise ratios.

The invention provides, therefore, an improved magnetic reproducing head and associated networks, which are capable of providing low frequency emphasis, so as to enable the reproducing system to reproduce with high fidelity and with high signal-to-noise ratios, recorded signals extending through a wide freqeuncy range.

While a particular embodiment of the invention has been shown and described, modifications may be made, and it is intended in the claims to cover such modifications which fall within the scope of the invention.

What is claimed is:

1. A magnetic reproducing system exhibiting low frequency emphasis including: a magnetic reproducing head having a magnetic core configured to define a common air gap and to define a first looped portion extending from one side of the air gap to the other and to define a second looped portion also extending from one side of the air gap to the other; a high frequency signal winding mounted on said first looped portion of said air gap in magnetically coupled relationship therewith, said high frequency signal winding having a first terminal at which output signals appear and having a second terminal; a low frequency signal winding mounted on said second looped portion of said core in magnetically coupled relationship therewith and having a substantially greater number of turns than said first signal winding, said low frequency signal winding having one terminal connected to a point of reference potential and having a second terminal; and resistance means connected from said second terminals of said low frequency and high frequency windings to said point of reference potential.

2. The system defined in claim 1 and which includes capacitor means electrically shunted across said low frequency winding for short-circuiting said winding at the higher signal frequencies.

3. The system defined in claim 1 and which includes inductance means shunting said high frequency signal winding for short-circuiting said winding at the lower signal frequencies.

4. A magnetic reproducing head for use in a magnetic reproducing system to correct the low frequency response of the system, said head including a magnetic core configured to define a common air gap and to define a first looped portion of relatively low cross sectional area extending from one side of the air gap to the other and to define a second looped portion of relatively high cross sectional area also extending from one side of the air gap to the other; a high frequency signal winding mounted on said first looped portion in magnetically coupled relationship therewith, said high frequency signal winding including means for effectively short-circuiting the lower frequency signals to divert the magnetic flux corresponding thereto into said second looped portion of said core; and a low frequency signal winding mounted on said second looped portion in magnetically coupled relationship therewith and having a substantially greater number of turns than said first winding.

References Cited by the Examiner

UNITED STATES PATENTS

| | | | |
|---|---|---|---|
| 1,828,189 | 10/1931 | Kiliani | 179—100.2 |
| 2,351,011 | 6/1944 | Camras | 179—100.2 |
| 2,633,504 | 3/1953 | Beer | 179—100.2 |
| 2,711,945 | 6/1955 | Kornei | 179—100.2 |
| 2,975,241 | 3/1961 | Camras | 179—100.2 |
| 3,013,123 | 12/1961 | Camras | 179—100.2 |
| 3,070,670 | 12/1962 | Eldridge et al. | 179—100.2 |

BERNARD KONICK, *Primary Examiner.*

L. G. KURLAND, *Assistant Examiner.*